(12) United States Patent
Norli

(10) Patent No.: US 10,458,871 B2
(45) Date of Patent: Oct. 29, 2019

(54) APPARATUS AND METHOD FOR MEASURING THE PRESSURE INSIDE A PIPE OR CONTAINER

(71) Applicant: HALFWAVE AS, Høvik (NO)

(72) Inventor: Petter Norli, Oslo (NO)

(73) Assignee: HALFWAVE AS, Høvik (NO)

(*) Notice: Subject to any disclaimer, the term of this patent is extended or adjusted under 35 U.S.C. 154(b) by 122 days.

(21) Appl. No.: 15/310,379

(22) PCT Filed: May 12, 2015

(86) PCT No.: PCT/NO2015/050080
§ 371 (c)(1),
(2) Date: Nov. 10, 2016

(87) PCT Pub. No.: WO2015/174850
PCT Pub. Date: Nov. 19, 2015

(65) Prior Publication Data
US 2017/0268950 A1 Sep. 21, 2017

(30) Foreign Application Priority Data
May 12, 2014 (NO) .................................. 20140596

(51) Int. Cl.
*G01L 11/04* (2006.01)

(52) U.S. Cl.
CPC .................................... *G01L 11/04* (2013.01)

(58) Field of Classification Search
None
See application file for complete search history.

(56) References Cited

U.S. PATENT DOCUMENTS 3,977,252 A * 8/1976 Krylova .................. G01L 11/04
73/703
4,009,616 A 3/1977 Wonn
(Continued)

FOREIGN PATENT DOCUMENTS

| GB | 2 397 887 A | 8/2004 |
|----|----|----|
| NO | 322349 B | 7/2006 |

OTHER PUBLICATIONS

J. Huang et al., "Ultrasonic Based Pressure Measurement by Using Cross-correlation" 2010 Second Pacific-Asia Conference on Circuits, Communications and System (PACCS), 2010 XP031794174, pp. 231-234.
(Continued)

*Primary Examiner* — Peter J Macchiarolo
*Assistant Examiner* — Jermaine L Jenkins
(74) *Attorney, Agent, or Firm* — Haug Partners LLP

(57) ABSTRACT

An apparatus and method for measuring the internal pressure of a pipe or container is disclosed. The apparatus includes an acoustical transmitter ($Tx_1$) mounted on a wall (1) of said pipe or container and a signal generator (2) connected to said transmitter and which is adapted to provide a signal to the transmitter. The signal from the transmitter is detected by two receivers ($Rx_1$, $Rx2$) mounted on said pipe or container in a distance from said transmitter ($Tx_1$). A processing unit (3) is connected to said transmitter and receivers, the processing unit being adapted to measure the travel time of an acoustical signal propagating between two receivers in the wall (i) and determine the pressure inside the pipe or container from said travel time.

11 Claims, 1 Drawing Sheet

(56) References Cited

U.S. PATENT DOCUMENTS

| | | | | |
|---|---|---|---|---|
| 4,869,097 A * | 9/1989 | Tittmann et al. | ....... | G01L 11/04 73/52 |
| 5,040,415 A | 8/1991 | Barkhoudarian | | |
| 7,624,651 B2 * | 12/2009 | Fernald | ................ | G01F 1/7082 73/861.27 |
| 7,673,526 B2 * | 3/2010 | Bailey | .................... | G01F 1/666 73/861.26 |
| 8,141,434 B2 * | 3/2012 | Kippersund | .............. | G01F 1/42 73/861.28 |
| 2010/0010750 A1 | 1/2010 | Baron et al. | | |
| 2013/0192351 A1 * | 8/2013 | Fernald | ................ | G01F 1/7082 73/61.49 |

OTHER PUBLICATIONS

K. J. Mok et al., "Generation of Sinc Wave by a One-Dimensional Array for Applications in Ultrasonic Imaging", IEEE Transactions on Ultrasonics, Ferroelectrics and Frequency Control, vol. 43, No. 2, Mar. 1996, pp. 285-295.

International Search Reportand Written Opinion dated Jul. 23, 2015 in corresponding International Application No. PCT/NO2015/050080.

Norwegian Search Report dated Dec. 12, 2014 in corresponding Priority Application No. 20140596.

* cited by examiner

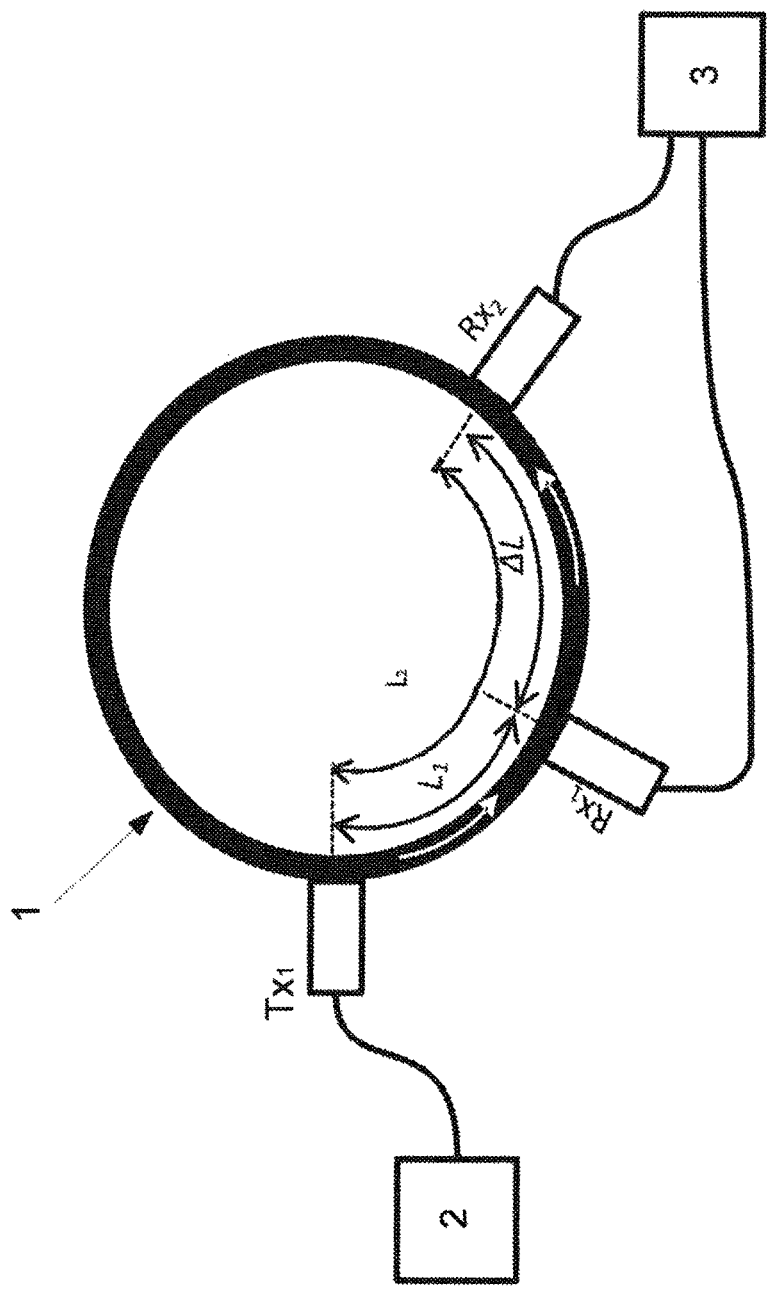

APPARATUS AND METHOD FOR MEASURING THE PRESSURE INSIDE A PIPE OR CONTAINER

CROSS-REFERENCE TO RELATED APPLICATIONS

This application is the National Stage entry under 35 U.S.C. § 371 of International Application No. PCT/NO2015/050080 filed on May 12, 2015, published on Nov. 19, 2015 under Publication Number WO 2015/174850, which claims the benefit of priority under 35 U.S.C. § 119 of Norway Patent Application Number 20140596 filed May 12, 2014.

FIELD OF THE INVENTION

The present invention relates to an apparatus and method for measuring the pressure inside a pipe or container.

BACKGROUND

Offshore pipelines must be shut down regularly for maintenance purposes. A maintenance period offshore involves a complete shut-down for typically 14 days. During this period the pipe between offshore and onshore installations will be shut from both sides. Existing pressure sensors at both installations are positioned outside the valves, and thus there are currently no way to monitor the pressure inside the closed pipe to detect a leakage during the shutdown period. It is also important to monitor and control gas pressure during the pipe shutdown process due to the fact that high pressure differences cause wear of the valves, and should be minimized.

From U.S. Pat. No. 3,977,252 there is known an apparatus for monitoring the pressure of a liquid inside a pipeline. The pressure is monitored by passing regularly repeated pulses of ultrasonic waves from a transmitter through the pipe wall, liquid and opposite side of the pipe wall to a receiver. The pressure is determined from the travel time of the pulses. Such an apparatus may find its application in monitoring pressure inside liquid-filled pipes. However, in a gas-filled pipe, the large acoustical impedance contrast between the pipe wall and the gas inside means that only a small portion of the acoustical energy is transferred through the gas. Most of the energy is transferred in the pipe wall directly from the transmitter to the receiver, the wall acting as a resonant waveguide for the acoustic energy. Pulses going the long path along the pipe wall will arrive earlier than pulses passing through the gas due to the large acoustic velocity in steel, and with much larger amplitude, it will completely mask the desired pulses that have passed through the gas. Furthermore would it be impossible to use this method in a multiple phase fluid or a mixture of fluids, as the velocity would differ according to which fluid or phase the waves pass through.

From WO 2014/004620 there is known a method for measuring the pressure inside a vessel using ultrasonic means. An ultrasonic signal is transmitted from a transmitter mounted on the wall of the vessel and received by a receiver mounted on the wall in a distance from the transmitter. A control- or processing unit is used to find the travel time of the signal from the transmitter to the receiver, and the pressure is computed as a function of the travel time.

Thus, there is a need for a method for measuring the pressure inside a pipeline or other container without contacting the interior space of said pipeline or container, and that can be used to measure the pressure reliably even if there should be a gas inside the pipeline or container, that is to provide reliable pressure data independently of which fluid or fluids are present inside the pipe or container. The method should provide a more accurate pressure reading than prior art methods.

It is an object of the present invention to provide an apparatus and method solving said needs. This is achieved in an apparatus and method as claimed in the appended claims.

In particular the invention relates to an apparatus for measuring the internal pressure of a pipe or container, the apparatus including in an acoustical transmitter mounted on a wall of said pipe or container, a signal generator connected to said transmitter and which is adapted to provide a signal to the transmitter, a first receiver mounted on said pipe or container in a distance from the transmitter, a second receiver mounted on the pipe or container in a further distance from the transmitter, and a processing unit connected to said first and second receiver, the processing unit being adapted to measure the travel time of an acoustical signal propagating from the first to the second receiver in the wall and determine the pressure inside the pipe or container from said travel time.

The use of two receivers means that the travel time may be measured with increased accuracy.

The processing unit is adapted to determine the pressure inside the pipe or container from the relation $$P \propto \frac{2\Delta Lt}{\Delta \tau D}$$

where P is the pressure, $\Delta L$ is the distance between the first receiver and the second receiver, t is the wall thickness, $\Delta T$ is the travel time, and D is the internal diameter of the pipe or container.

According to a preferred embodiment, the signal generator is adapted to emit a signal exciting a thickness mode of said wall.

This will greatly increase the coupling between the transducers.

The processing unit may also be adapted to determine the travel time by cross correlating the received signals.

The invention is intended to be used in noisy environments, and the use of cross-correlation will increase the accuracy of the determination of the travel time between the receivers.

The invention also relates to a corresponding method for measuring the internal pressure of a pipe or container.

The invention will now be described in reference to the appended drawing which shows a preferred embodiment of an apparatus according to the invention.

DETAILED DESCRIPTION

The invention is based on observing the behaviour of acoustic waves travelling in the pipe/container wall, and not as in prior art, by observing waves travelling through the medium inside the pipe/container.

A pressure difference between the inside and outside of the pipe/container will set up stress in the wall. For a cylindrical wall the stress σ is given by:

$$\sigma = \frac{PD}{2t}$$

Where P is the pressure difference, D is the internal diameter, and t is the wall thickness.

There is a nearly linear relationship between wall stress and phase velocity. Measuring phase velocity will provide a value of the wall stress from which the pressure difference over the wall may be deducted. Hence, $$\sigma \propto v_p$$

where $v_p$ is the phase velocity in the wall of the pipe or container.

FIG. 1 is a schematic illustration of the apparatus for measuring pressure according to the invention. The inventive apparatus includes a signal generator 2 driving a transmitter $Tx_1$ mounted onto the wall 1 of a pipe or container.

The transmitted signal may be a sharp spike, a square wave, or a burst pulse. The burst pulse may be a plain sine wave burst, a swept wave burst or a sinc burst pulse. It is preferred to use a burst pulse to avoid dispersion and to ease the detection in a noisy environment. It is further preferred to let the burst pulse excite one of the thickness resonance frequencies of the wall. There are several thickness resonance frequencies available, but here it is preferred to use the first harmonic (wavelength=t) due to the distance to other mode frequencies. The signal will propagate along the wall by several modes, notably as shear- and Lamb-waves.

The periodic signal is picked up by two receivers $Rx_1$ and $Rx_2$. The received signals are digitized and fed to a processing unit 3. The processing unit is adapted to determine the time shift between the receivers. The time shift may be determined by cross-correlating the signals from the receivers. Another option is to measure the time shift between identified zero-crossings in the signals, or measure when the signals exceed a specified threshold for determining the leading edge of the first arrival.

A general description of the method will be as follows;

A sound pulse is transmitted from an acoustic contact transducer transmitter, $Tx_1$ to a first acoustic transducer receiver, $Rx_1$, and preferably also to a second acoustic contact transducer, $Rx_2$ arranged on a pressure container or pipe. The pulse can be a so-called "burst" pulse of a predefined number of periods. It could e.g. be between 1 and 20 periods, preferably 5-10 periods. The pulse can typically have a centre frequency within the band from 50 kHz to 1000 kHz. The pulse should be adapted to the thickness of said pressure container or pipe, so that a clear pulse is received at said receivers, $Rx_1$ and possibly also $Rx_2$.

The time lapse, $\tau_1$, from said pulse is transmitted at $Tx_1$ until it is received at the first receiver, $Rx_1$, is measured using a suitable time detection method, e.g. a cross-correlation or zero-crossing detection method.

The time lapse, $\tau_2$, from said pulse is transmitted at $Tx_1$ until it is received at the second receiver, $Rx_2$, is measured using the same time detection method.

The speed of sound through the wall of the container or pipe, $V_p$, can be found through $L_1$, the distance from $Tx_1$ to $Rx_1$, or, if two receivers are used, the distance between $Rx_1$ and $Rx_2$, $\Delta L$:

$$v_p = \frac{\Delta L}{\Delta \tau}, \text{ where} \begin{cases} \Delta \tau \equiv \tau_2 - \tau_1 \\ \Delta L \equiv L_2 - L_1 \end{cases}.$$

If only one receiver is used, the following equations apply:

$$\tau_1 = \frac{L_1}{v_p} + \tau_{EL},$$

Thereby:

$$v_p = \frac{L_1}{\tau_1 - \tau_{EL}},$$

Where $\tau_{EL}$ represents the delay time of the electronics, that should be accounted for.

It thereby follows that the method is equally suitable with the use of one or two receivers.

Now it follows that:

$$\sigma \propto \frac{\Delta L}{\Delta \tau}, \text{ or } \frac{PD}{2t} \propto \frac{\Delta L}{\Delta \tau}$$

so that:

$$P \propto \frac{2\Delta L t}{\Delta \tau D}.$$

By using a calibration procedure for a given container or pipe, it should be feasible to attain a pressure resolution of about 1 bar.

The transducers may be clamped to the pipe/container by any suitable method, e.g. a strap around the pipe/container, or strong magnets, and may include a suitable coupling gel to improve the acoustical coupling to the pipe/container.

The set-up shown includes one transmitter and two receivers. It is also possible to use one transmitter and only one receiver measuring the time shift for the signal between the transmitter and receiver. However, it may be difficult to achieve a satisfactory accuracy with such a set-up. The method is equally suitable with lamb-waves and shear waves.

In FIG. 1 the transmitter and receivers are located along the circumference of a pipe or container, but they could also be placed in the longitudinal direction of the pipe or container, or in any other possible direction.

The invention claimed is:

1. An apparatus for measuring the internal pressure of a pipe or container, comprising:
   an acoustical transmitter mounted on a wall of said pipe or container,
   a signal generator connected to said transmitter and which is adapted to provide a signal to the transmitter,
   a first receiver mounted on said pipe or container at a distance from the transmitter,
   a second receiver mounted on the pipe or container at a further distance from the transmitter,
   a processing unit connected to said first and second receiver, the processing unit being adapted to measure the travel time of an acoustical signal propagating from the first to the second receiver in the wall and determine the pressure inside the pipe or container from said travel time.

2. An apparatus according to claim 1, wherein the processing unit is adapted to determine the pressure inside the pipe or container from the relation $$P \propto \frac{2\Delta L t}{\Delta \tau D}$$

where P is the pressure, ΔL is the distance between the first receiver and the second receiver, t is the wall thickness, Δτ is the travel time, and D is the internal diameter of the pipe or container.

3. An apparatus according to claim 1, wherein the signal generator is adapted to emit a signal exciting a thickness resonance frequency of said wall.

4. An apparatus according to claim 1, wherein the processing unit is adapted to determine the travel time by cross correlating a first signal received from the first receiver and a second signal received from the second receiver.

5. A method for measuring the pressure inside a pipe or container, the method comprising steps of:
  transmitting an acoustical signal from an acoustical transmitter mounted on a wall of said pipe or container,
  receiving the acoustical signal at a first receiver mounted on said pipe or container at a distance from the transmitter,
  receiving the acoustical signal at a second receiver mounted on the pipe or container at a further distance from the transmitter,
  measuring the travel time of the acoustical signal propagating from the first to the second receiver in the wall, and
  determining the pressure inside the pipe or container from said travel time.

6. A method according to claim 5, wherein the pressure is determined from the relation $$P \propto \frac{2\Delta L t}{\Delta \tau D}$$

where P is the pressure, ΔL is the distance between the first receiver and the second receiver, t is the wall thickness, Δτ is the travel time, and D is the internal diameter of the pipe or container.

7. A method according to claim 5, wherein the acoustical signal is exciting a thickness resonance frequency of the wall.

8. A method according to claim 5, wherein the acoustical signal is a sinc wave packet exciting at least one thickness resonance frequency of the wall.

9. A method according to claim 5, wherein the travel time is determined by cross-correlating signals received in said points.

10. A method according to claim 5, wherein the acoustic signal is a sound pulse.

11. A method according to claim 10, wherein the acoustic signal is a burst pulse of a predefined number of periods.

* * * * *